United States Patent

Dymoke

[15] 3,692,958

[45] Sept. 19, 1972

[54] MICROPHONE HEADSETS

[72] Inventor: Leslie E. Basil Dymoke, Bradshaw, Edgware, England

[73] Assignee: International Standard Electric Corporation, New York, N.Y.

[22] Filed: March 2, 1971

[21] Appl. No.: 120,207

[30] Foreign Application Priority Data

March 2, 1970 Great Britain............9,880/70

[52] U.S. Cl................................................179/156 A

[51] Int. Cl................................................H04m 1/05

[58] Field of Search.......................................179/156

[56] References Cited

UNITED STATES PATENTS

| | | | |
|---|---|---|---|
| 3,440,365 | 4/1969 | Bryant et al. | 179/156 |
| 3,184,556 | 5/1965 | Larkin | 179/156 |
| 3,280,273 | 10/1966 | Flygstad et al. | 179/156 |
| 3,588,384 | 6/1971 | Negley | 179/156 |
| 2,904,640 | 9/1959 | Dreher et al. | 179/156 |

*Primary Examiner*—William C. Cooper
*Assistant Examiner*—William C. Cooper
*Attorney*—C. Cornell Remsen, Jr., Walter J. Baum, Percy P. Lantzy, J. Warren Whitesel, Delbert P. Warner and James B. Raden

[57] ABSTRACT

A microphone headset worn on the ear without a head-band. The receiver and microphone are in a housing suspended from an earmould carried in the outer ear and a speech tube extends from the microphone to near the lips.

1 Claim, 5 Drawing Figures

Inventor
L.E.B. DYMOKE-BRADSHAW
By O. O. Warner
Attorney

MICROPHONE HEADSETS

This invention relates to microphone headsets for use by telephone operators or other persons using communications systems in a hands free manner.

According to the invention there is provided a microphone headset having in combination:

a microphone and a receiver;

means for holding the microphone and receiver together; an acoustic tube adapted to convey sound from the wearer's mouth to the microphone and having means at one end for attaching it to the microphone; and an earmould shaped to fit into the wearer's outer ear, the earmould having means for attaching it to the receiver and a tubular passage adapted to convey sound from the receiver to the ear canal;

the combination being such that when the headset is in use the receiver, microphone, holding means and acoustic tube are carried by the wearer's ear together with the earmould.

Embodiments of the invention will now be described with reference to the accompanying drawings in which.

Figure 1:
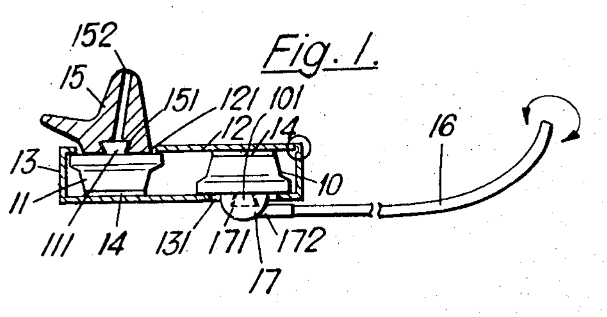
FIG. 1 shows a plan view, partly sectioned, of a first microphone headset according to this invention.
Figure 1A:
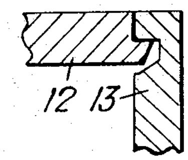
FIG. 1A shows an enlarged view of the portion of the microphone headset ringed in FIG. 1.
Figure 2:
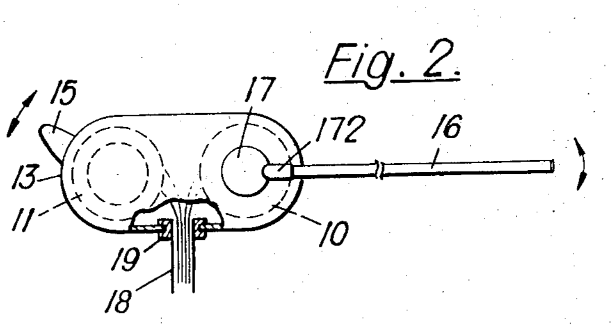
FIG. 2 shows a side view of the microphone headset shown in FIG. 1.

Referring now to FIGS. 1, 1A and 2, the microphone headset includes two electro-acoustic transducers, a microphone (transmitter) 10 and a receiver (earphone) 11. Both the transducers 10 and 11 are miniature electromagnetic "button" transducers of the type known for their use in hearing aids. Each transducer (which can have a moving-iron drive unit) has a socket (not shown), and a tubular projection 101 (111) for the inlet (or egress respectively) of sound. The tubular projections (nipples) have a re-entrant frusto-conical shape.

The two transducers 10 and 11 are housed side-by-side in a two-part container or housing consisting of a plastics lid 12 which snap-fits on to a plastics tray 13 in the manner shown in FIG. 1A to provide a flush surface on the container. The internal depth of the container is just greater than that of the transducers 10 and 11 (not counting the nipples 101, 111), and this difference in depth is taken up by soft buffers 14 which protect the transducers and take up slack in the snap-fitting arrangement.

The receiver nipple 111 projects through a hole 121 and the lid 12 and clips into a socket portion 151 of a plastics earmould 15 which is shaped to fit into the wearer's outer ear and has a tubular passage 152 adapted to convey sound from the receiver 11 to the ear canal of the wearer. The socket 151 in the earmould is such that the earmould 15 and the container with the receiver 11 are capable of relative rotation around the axis of the nipple 111. The earmould 15 is generally of the type known for its use in holding the "button" type of hearing aid earphones, although it may be modified from this generally known type in a manner which will be described later. The earmould 15 may, if desired, be custom moulded to fit the ear of the individual wearer, or may be selected from a limited number of standardized sizes and shapes.

An acoustic tube (speech tube) 16 which is adapted to convey sound from the wearer's mouth to the microphone 10 is connected to a cap 17 having a socket 171 by which it clips on to the microphone nipple 101 where it projects through a hole 131 in the tray 13. The connection 172 between the tube 16 and the cap 17 is constructed so that the tube 16 is rotatable around its own longitudinal axis; for example it could be a ball and socket joint with a tubular passage through it leading from the tube 16 to a tubular passage in the cap 17 which leads to the sound inlet passage of the microphone nipple 101. The socket 171 in the cap 17 is such that the cap 17, and hence the tube 16, is capable of rotation around the axis of the nipple 101. The tube 16 could be constructed in two parts slideable with respect to each other so that the total length of the tube 16 can be reduced or extended over a range of adjustment.

Electrical connections to the two transducers are made via wires which extend in a cord 18 through a grommet 19 in the tray part 13 of the container.

Figure 3:
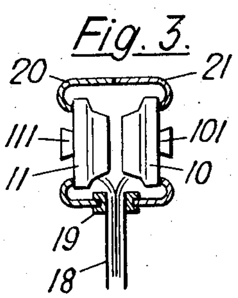
FIG. 3 shows a sectioned end view of a second microphone headset according to this invention, without the earmould and the acoustic speech tube.

Referring now to FIG. 3, a second microphone headset is shown with the microphone 10 and the receiver 11 arranged back-to-back. The earmould and speech tube are not shown, but they are the same as the earmould 15 and the acoustic tube 16 with its cap 17 shown in FIGS. 1 and 2, and clip on to the nipples 111 and 101 respectively in the same manner as shown in FIGS. 1 and 2. A two part plastics container or housing is again provided, but this time it takes the form of two cylinders 20 and 21 which are held together by a snap-fit arrangement (not shown). Buffers (not shown) are provided between the two transducers to protect them and take up slack in the snap-fit arrangement.

Figure 4:
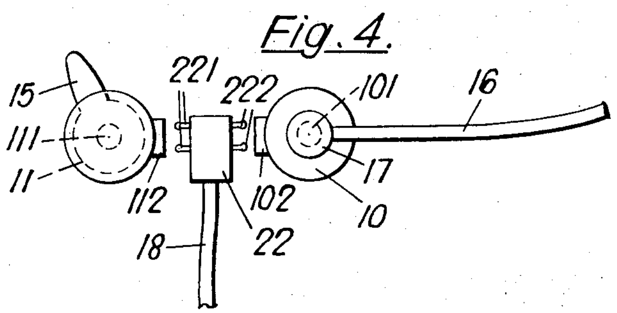
FIG. 4 shows an exploded side view of a third microphone headset according to this invention.

Referring now to FIG. 4, a third microphone headset is shown which again has a receiver 11 having an earmould 15 clipping on to its nipple 111; and a microphone 10 having a speech tube 16 with a cap 17 clipping on to its nipple 101. However, no container or housing as described above with reference to FIGS. 1, 1A, 2 and 3 is provided as the means for holding the microphone and receiver together. Instead the cord 18 is terminated in a junction box 22 from which extend two pairs of pins 221 and 222. The pair of pins 221 plug into the socket 112 of the receiver 11, effecting an electrical connection and a mechanical support. Likewise the pair of pins 222 plug into the socket 102 of the microphone 10, effecting an electrical connection and a mechanical support.

With all the three microphone headsets described above, the user only has to plug the earmould 15 into his ear to wear the headset. Adjustment before use of the headset consists in arranging the end of the speech tube 16 near the lips. With the earmould 15 fixed in position in the ear the remainder of the headset combination is first rotated around the earmould; the cap 17 (with the tube 16) is then rotated around the microphone; and finally the tube 16 is rotated around its own axis and the length of the tube 16 is reduced or extended.

For most users there will be a common best position regarding one or both of the first two adjustments mentioned above, and so a click-stop arrangement can be provided between the earmould 15 and the receiver nipple 111 or between the speech tube cap 17 and the microphone nipple 101, or at both junctions, so that the user can readily find and lock the headset in this common best position before making final adjustments of the position of the end of the speech tube 16.

The microphone headsets described above are simple in construction, lightweight and easily adjusted, enabling them to be used with maximum convenience and with minimum discomfort and fatigue. They are intended for use together with a microphone amplifier which makes them compatible with conventional telephone circuits. The microphone amplifier will be housed in a separate container which can be carried by the user of the headset on a clothing clip or a lanyard. Alternatively, the amplifier can be housed in a plug with which the headset is connected to communications apparatus (e.g. a telephone operator's switchboard) or mounted in the communications apparatus itself.

The total weight of each of the microphone headsets described above (including the earmould but not including the microphone amplifier) is approximately 1 ounce. As will be appreciated from the above description, when the headset is in use the receiver, microphone, means for holding the receiver and microphone together, and the acoustic tube are carried by the wearer's ear together with the earmould. The lightweight construction of the headsets described above is such that it should be acceptable to most, if not all, users that the receiver, microphone, holding means and acoustic tube are carried completely by the known type of earmould described above which in turn is carried completely within the outer ear. However, if desired, the microphone headsets described above could be modified to give additional support; this would be done by modifying either the earmould or the means for holding the receiver and microphone together to provide a clip portion which fits behind the wearer's ear.

With all the microphone headsets described above, provision can be made for a further cord leading from the means for holding the receiver and microphone together to a second receiver for the wearer's other ear. In particular, the junction box 22 shown in FIG. 4 can be modified to provide a plug-in arrangement for the other cord.

I claim:

1. A microphone headset comprising:

a microphone having a socket to receive a pair of pins, a receiver having a socket for receiving a second pair of pins, means for holding the microphone and receiver together including a junction box from which extend two pairs of pins, said pairs being respectively received in said microphone and receiver sockets, an acoustic tube adapted to convey sound from the wearer's mouth to the microphone, means for attaching one end of the acoustic tube to the microphone, an earmould shaped to fit into the wearer's outer ear, and means for attaching the earmould to the receiver to enable the earmould to convey sound from the receiver to wearer's ear canal.

* * * * *